Dec. 29, 1931.   J. A. DORAN   1,838,811
APPARATUS FOR USE IN INFLATING PNEUMATIC ARTICLES
Filed April 16, 1926
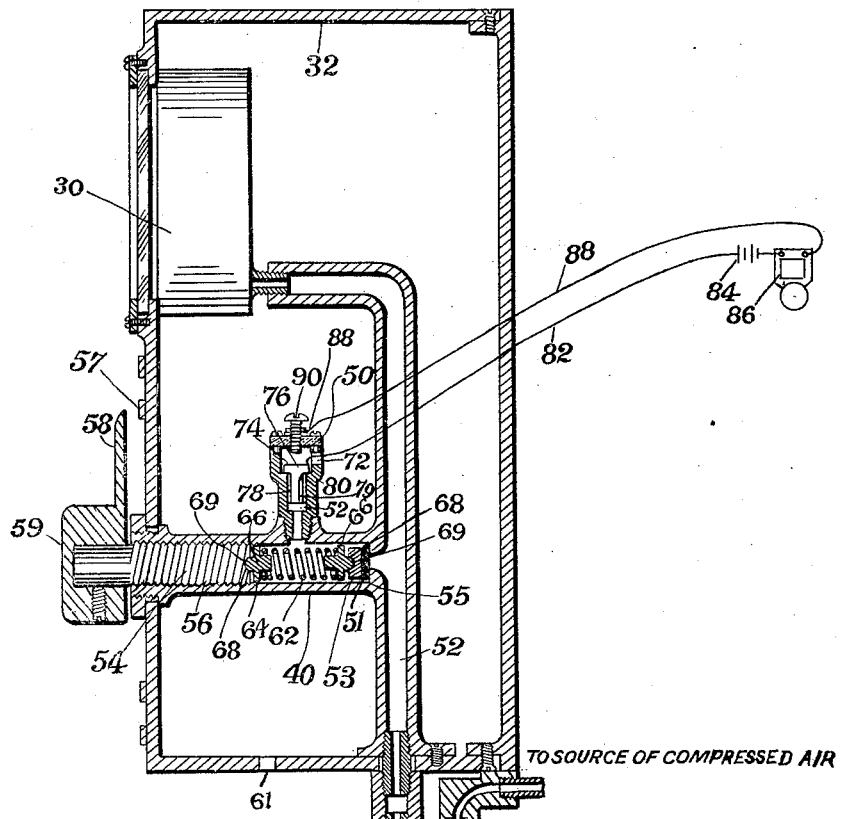
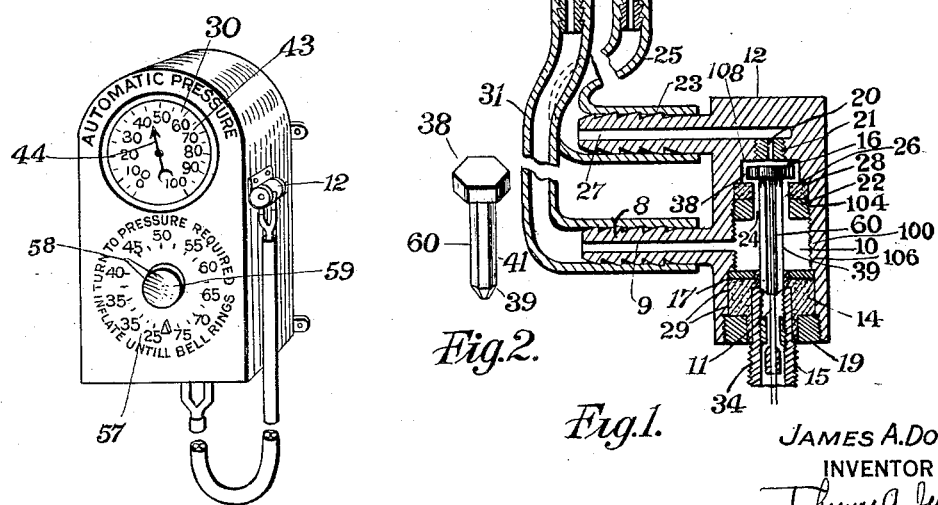
Fig.3.   Fig.2.   Fig.1.
JAMES A. DORAN
INVENTOR
BY
ATTORNEY Patented Dec. 29, 1931

1,838,811

UNITED STATES PATENT OFFICE

JAMES A. DORAN, OF PROVIDENCE, RHODE ISLAND

APPARATUS FOR USE IN INFLATING PNEUMATIC ARTICLES

Application filed April 16, 1926. Serial No. 102,591.

My invention relates to an apparatus for use in inflating pneumatic articles having an inflating valve, especially pneumatic tires.

While I am aware that others have attempted to provide devices of this description which will permit one to pump at a substantially high pressure and at the same time accurately continuously measure the lower tire pressure, so far as I am aware I am the first to provide an entirely satisfactory device for this purpose. In principle, my device comprises a chamber, whether it be made as an integral part of a tire chuck or not, provided with a detachable connection to a tire valve and having an air intake opening connectible to a source of compressed air under a pressure equal or greater than the desired tire pressure and of substantial smaller net cross sectional area than the net cross sectional area of the tire valve to cause the pressure in the chamber to coincidentally continuously substantially equal the tire pressure, so that the chamber may be connected to a high pressure supply line and also to a tire and the gauge may continuously coincidentally substantially accurately register the tire pressure during the increase thereof. In addition I provide a safety valve connected to said chamber preferably adjustable to release at predetermined settings thereof which may be used either conjointly with or alternately instead of the pressure gauge to render the device absolutely safe. I also provide I believe for the first time a sound device operable upon release of the safety valve. It is thus obvious that I have provided a completely safe device, for if the operator gets careless and does not notice the pressure gauge, the pressure in the tire cannot rise beyond the predetermined amount, for not only will it be released through the safety valve but it will also sound a warning to the careless operator.

Further objects of my invention are to provide a device of this description of simple and rugged construction that will absolutely prevent the injuries and blow-outs caused as a result of the former "pump and try method" and provide a thoroughly safe and accurate method of inflating tires so safe and easy to operate that it may be used by the customer himself, thereby eliminating the cost of an extra tire man.

As my device is so accurate, it is obvious that it will accurately inflate the tires to the most efficient pressure recommended by tire manufacturers and thus lengthen the life of the tires, and that as it is so accurate it appreciably reduces the large former expense of producing compressed air, a great portion of which was formerly wasted.

A further object of my invention is to appreciably lessen the time necessary to inflate pneumatic tires; in practice it has been actually found that the average time required to inflate automobile tires has been reduced from approximately 12 to approximately 3 minutes, thereby permitting many more automobiles to be served than formerly in congested areas.

Further objects of my invention are to provide a device which will permit the use of a large rugged gauge of long life and accuracy located in a permanently protected position which eliminates handling thereof and prevents abuse thereof, and to eliminate the use of former easily lost hand gauges incidental to the "pump and try method" the cost of replacing which has been a very large item in garage and service station up-keep.

A further object of my invention is to provide an improved chuck for use in inflating automobile tires particularly adapted to be used with the other features of my invention.

These and such other objects of my invention as may hereinafter appear will be best understood from a description of various embodiments thereof such as are shown in the accompanying drawings.

In the drawings, Fig. 1 is a cross sectional view of the preferred embodiment of my invention employing my preferred chuck having my improved air chamber and restricted orifice located therein movably attached to a pressure gauge, safety valve and sound device permanently mounted together in a control box therefor.

Fig. 2 is a perspective view of the valve head and attached stem I preferably employ in my chuck.

Fig. 3 is a perspective view of the preferred form of my device shown in Fig. 1.

In the drawings, wherein like characters of reference indicate like parts throughout, 10 generally indicates the enclosed chamber the construction of which comprises one of the main features of my invention. Though this chamber 10 may be connected at any suitable point in the line connecting the tire with the source of compressed air, I preferably, as shown in the embodiments shown in Figs. 1 to 3, construct said chamber 10 within the tire chuck 12. Said chamber 10 is provided with a detachable connection to a tire valve 15 which may comprise the detachable chuck connection 14 shown in Fig. 1. The chamber 10 is also provided with an air intake orifice 20 suitably connected to a source of compressed air (not shown) preferably a pump under a substantially greater pressure than the desired tire pressure, said orifice 20 being of substantially smaller net cross sectional area than the next cross sectional area of the tire valve 15 to cause the pressure in the chamber 10 to coincidently continuously substantially equal the tire pressure. I also preferably provide the pressure gauge 30 suitably connected to said chamber 10 which, as will be apparent, is also indicative of the tire pressure. I also provide the safety valve 40 preferably adjustable to release at predetermined settings also connected to said chamber 10 adapted to be used alternately with or in conjunction with the pressure gauge 30 as desired. I also preferably provide the sound device 50 operative in release of said safety valve 40 and means 60 to open the air supply to said chamber 10 when said chamber is connected to a tire valve. It is thus obvious that when the chamber 10 is connected to a tire valve and the air supply to said chamber opened, that air will flow from the source of compressed air into said chamber 10, that the pressure gauge 30 if employed will actually register the pressure in the chamber 10 which is also substantially equal to the tire pressure and that the safety valve 40 which may be set in a manner to be explained to release at desired predetermined settings will release at the desired predetermined setting thereof to prevent an excess of air from going into the tire, coincidentally with its release sounding the sound device 50 to warn the operator that the tire is correctly inflated.

Having generally described the main features and operation of my invention I will now describe in detail the detailed features of my preferred embodiments thereof. When the chamber 10 is located in the chuck 12 as shown in Fig. 1, I preferably construct my chuck as follows: The chamber 10 therein is preferably constructed in two parts 16 and 18, the valve head recess 16 and the outer chamber 18 preferably separated from each other by the partition wall 22 which in the embodiment shown in Figs. 1–3 comprises the seat 22 adapted to be threaded into said chamber 10 from the lower end of said chuck. Said seat 22 is provided with the central connecting orifice 24 connecting said recess 16 and chamber 18 of smaller diameter than the valve head 38 and the resilient non-flexible gasket 26 similarly centrally perforated as at 28 is preferably placed on top of said seat 22. The chamber 18 is preferably provided with the resilient non-flexible gasket 14 suitably mounted at the base thereof and in my preferred embodiment non-flexibly secured within between the retaining screw 19 and washer 17, said washer, screw and gasket being provided with the central orifices 29 so that said outer chamber 18 may be connected to a tire valve. The recess 16 is also provided with the rescricted air inlet orifice 20 adapted to be connected to a source of compressed air. In my preferred embodiment shown in Fig. 1, I have provided a constricted orifice by providing a threaded screw 21, having a central orifice 20 therein, adapted to be threaded into the upper part of the chuck 12. I preferably provide a plurality of screws 21 having the orifices 20 of different diameters therein so that the size of the orifice 20 may be readily selected merely by unscrewing a screw 21 and inserting another one. Screw 21 is thus also removable to easily permit cleaning any foreign matter that may accumulate and obstruct hole 20. The upper portion of the chuck is provided with a nipple 23 adapted to receive the hose 25 thereon which is suitably connected to the source of compressed air the line 27 leading from said orifice 20 to the end of said nipple 23. I also provide the nipple 8 projecting from the lower portion of said chuck and provided with the line 9 emerging from said lower chamber 18. The hose 31 is adapted to detachably connect said chuck nipple 8 with a control box 32 later to be described, which control box preferably contains the pressure gauge 30, the safety valve 40 and the sound device 50.

As hitherto explained, the inlet orifice 20 to said recess 16 is of a substantially smaller cross sectional area than the net cross sectional area of the tire valve 15 which includes the usual tire valve and stem 34 shown in detail in Fig. 1. In my preferred embodiment, I preferably provide the valve 60 to close the connecting orifice 28 between said recess 16 and chamber 18, said valve plunger 60 preferably comprising the valve head 38 adapted to rest on the resilient gasket 26 in said valve head recess 16 to normally prevent passage of air to said chamber 18 and the valve stem 39 of a diameter slightly less than that of the orifice 24 in the valve seat 22 and other orifices 29 adapted to project downwardly through said central orifices 28 and 24 in said seat and gasket 22 and 26 respectively through said chamber 18 and through the orifice 29 in said tire valve connecting gasket 14 to contact the stem 34 of the tire valve 15 to raise said valve head 38 away from said gasket 26 when said tire valve stem 34 is inserted within the gasket 14 and to contact the upper end of the tire valve plunger stem 11 to simultaneously open the tire valve 15. The valve stem 39 is preferably circumferentially fluted as at 41 throughout its length to permit the free passage of air through the connecting line 24 from the recess 16 to the chamber 18 when the valve head 38 is raised as hitherto explained away from said gasket 26.

While any suitable type of pressure gauge 30 may be employed, I preferably employ a pressure gauge equipped with a dial 43 on the face thereof and provided with the usual pointer 44 which is actuated by the air pressure in the chamber 10 in a well known manner to indicate the chamber pressure and also the tire pressure on said gauge.

As stated, I preferably provide the line 52 connected to said chamber 10 and I provide the indicating member 54 threadedly engaged with said device as at 56 threadedly engaged with the control box 32. Said member 54 is provided with the pointer member 58 and knob 59 adjustably secured thereto adapted to revolve over the exterior of said device whether it be the control box and to register against calibrated pressure indicia 57 on the face of said device. The line 52 is preferably provided with the valve disk 51 in the preferred embodiment shown comprising the flexible disk 51 and attached metallic pressure plate 53 adapted to seat against the shoulder 55 formed in said line 52. I provide the spring 62 adapted to abut the valve disk 51 and said threaded member 54. In my preferred embodiment, the spring 62 preferably registers against the flanges 64 provided on the studs 66; being preferably provided with central projections 68 adapted to seat in cooperating central depressions 69 in said threaded member 54 and valve disk 51 respectively to continuously center said spring 62. I preferably construct the pitch of the threaded connection 56 between said threaded member 54 and said device in such a manner that a substantially complete turn of the threaded member 54 will vary the compression of the spring 62 throughout the desired predetermined releasing pressures. The line 52 is also provided with the discharge port 72. It is thus obvious that when after calibration, the pointer 58 of the threaded member 54 is set against the predetermined indicia 57 on said device at the desired pressure for which it is desired to have the safety valve release, that when the pressure in said line 52 has reached said selected pressure that the air will push said disk 51 away from said seat 55 to permit an egress of air around said disk 51 and its plate 53 through the balance of the line 52 and out through the discharge port 72 thereof. It is thus obvious that when the desired pressure has been obtained the entire excess pressure will dicharge through said discharge port 72 without further increasing the pressure in the chamber 10 or the tire pressure, thereby absolutely eliminating blowouts which are dangerous to the operator. Control box 32 is provided with vent 61 to permit free exhaust of air discharging from port 72.

As stated, I also employ a sound device 50 preferably actuated by the rush of escaping excess air through said line 52 on release of said safety valve 40 as just explained. In the preferred embodiment shown in Fig. 1 to provide a very accurate sound device which will always function, I preferably provide the electric sound device about to be explained. I provide the metallic plug 74 comprising the head 76 and constricted stem 78 provided with the flutes 79 having the valve head 76 suitably seated on a shoulder 80 in said line 52, the portion of said line 52 containing said plug 74 preferably extending in a vertical direction. It is thus obvious that normally the valve head 76 will close this portion of the line 52. The plug 76 is connected by means of the wire 82 to the suitable source of electricity 84, an electric battery 84 as shown, the metallic plug 76 thus forming a contact point of an electric circuit. The circuit is also connected to the electric bell 86. The opposite terminal 88 of said electric circuit is suitably connected to a fixed contact point 90 mounted in said line 52 above said plug head 76. It is thus obvious that as the safety valve 40 is released that the plug 78 will be forced upwardly by the egress of compressed air to cause the head 76 thereof to contact the suitably insulated fixed contact point 90 above it to complete an electric circuit through the terminals 82 and 88 to ring the electric bell 86. When the plug 76 rises, its flutes 79 open to the atmosphere, allowing unrestricted egress for the escaping air.

It is obvious that in the broader aspects of my invention, it is immaterial what species the certain main features thereof take and whether they are all or partially combined directly in a tire chuck or parts of them are mounted in a control box or otherwise. As also explained, a main feature of my invention is to provide in devices of this description, a safety valve so that a careless operator cannot possibly inflate a tire beyond the desired predetermined set pressure.

Though I have shown and described my invention for use in inflating a pneumatic tire, it is obvious that it may be employed to inflate any pneumatic article provided with an inflating valve.

Though I have described the features of my chuck as being in a vertical line and relatively below and above each other, it is obvious that they may be located in any relative position without departing from the spirit of my invention.

It is understood that my invention is not limited to the specific embodiments shown and that various deviations may be made therefrom without departing from the spirit and scope of the appended claim.

What I claim as new and desire to secure by Letters Patent is:

A chuck for use in inflating tires comprising a body portion, bored and counter bored to form several chambers of varying diameter, the first and smaller of said chambers having an inlet connectible to a source of high air pressure and being threaded to removably receive a flow restrictor having an orifice of the proper size to reduce the high air pressure to the tire pressure in said chuck below said restrictor, a second chamber of larger diameter below said chamber forming a valve chamber, a third chamber interiorly threaded and of still larger diameter below said second chamber, a gasket seated at the shoulder between said second and third chambers, an exteriorly threaded ring detachably securable within said third chamber forming with said gasket a partition line between said second and third chambers, said third chamber having a low pressure outlet connectible to a pressure responsive device; a flexible air tight connection for a tire stem detachably securable within said chuck below said third low pressure chamber, and a valve movable within said valve chamber having a stem projecting downwardly through said low pressure chamber and through said connection adapted on contact with the tire valve to unseat said valve to permit passage of air into the third low pressure chamber and to the tire.

In testimony whereof I affix my signature.

JAMES A. DORAN.